United States Patent [19]

Kitada

[11] Patent Number: 5,606,611
[45] Date of Patent: Feb. 25, 1997

[54] RECEIVING STATION MANAGEMENT APPARATUS

[75] Inventor: Yasumasa Kitada, Tokyo, Japan

[73] Assignee: NEC Corporation, Japan

[21] Appl. No.: 364,294

[22] Filed: Dec. 27, 1994

[30] Foreign Application Priority Data

Dec. 27, 1993 [JP] Japan ................... 5-333027

[51] Int. Cl.⁶ .................. H04N 7/167; H04L 9/00
[52] U.S. Cl. .................. 380/10; 348/6; 348/10; 380/9; 380/20; 380/21; 380/23; 380/49
[58] Field of Search .................. 348/6, 9, 10; 380/9, 380/10, 20, 21, 23, 49, 50

[56] References Cited

U.S. PATENT DOCUMENTS

| | | | |
|---|---|---|---|
| 4,736,421 | 4/1988 | Morita et al. | 380/20 |
| 4,739,510 | 4/1988 | Jeffers et al. | 380/20 X |
| 4,991,207 | 2/1991 | Shiraishi et al. | 380/9 |
| 4,998,278 | 3/1991 | Sasa | 380/23 |
| 5,204,900 | 4/1993 | Pires | 380/20 |
| 5,351,294 | 9/1994 | Matsumoto et al. | 380/23 |

FOREIGN PATENT DOCUMENTS 4115736  4/1992  Japan ................ H04K 1/04

Primary Examiner—Bernarr E. Gregory
Attorney, Agent, or Firm—Ostrolenk, Faber, Gerb & Soffen, LLP

[57] ABSTRACT

In a transmitting unit, receiving stations are formed into a plurality of groups, and information associated with the right to receive a broadcasting service is rewritten in units of groups by converting the information into a packet (group information) and transmitting it together with video and audio signals. In each receiving station, group information is extracted from a received signal, and a group number included in the received packet is compared with a group number stored in a memory in advance. When they coincide with each other, information associated with the right to receive a broadcasting service is written in the memory. With this operation, information associated with the right of each receiving station to receive a broadcasting service is efficiently transmitted.

2 Claims, 3 Drawing Sheets

RECEIVING STATION MANAGEMENT APPARATUS

BACKGROUND OF THE INVENTION

1. Field of the Invention

The present invention relates to a receiving station management apparatus for transmitting video and audio signals and, more particularly, to a management apparatus based on the grouping of receiving stations in satellite broadcasting and communication.

2. Description of the Prior Art

In a conventional receiving station management apparatus such as that discussed in Telecommunication Technology Council Inquiry Report No. 17, each receiving station is managed in such a manner that a work key for decrypting encrypted program information and information associated with a contract with each receiving station ("contract information") are transmitted, as individual information, to each receiving station, in order to prevent a party from illegitimately receiving a broadcasting/communication service by altering the information. When the contents of the above information are to be rewritten, individual information is transmitted to each receiving station as a subscriber again (refer to Japanese Unexamined Patent Publication No. 4-115736).

Since this conventional receiving station apparatus transmits a work key and contract information as individual information to rewrite the contents of the information, it takes a longer time for all the receiving stations to receive this information as the number of receiving stations increases.

In existing pay satellite broadcasting, a maximum of 111 packets of scramble information can be transmitted per second. Assuming that 100 packets of individual information are transmitted and, if the total number of receiving stations is 1,000,000, it therefore takes about 13 hours for all the receiving stations to receive the individual information.

SUMMARY OF THE INVENTION

It is, therefore, an object of the present invention to provide a receiving station management apparatus which can perform a rewrite operation much more quickly than an apparatus using the individual information.

According to a receiving station management apparatus of the present invention, receiving stations are formed into a plurality of groups, and associated information (to be referred to hereinafter as "group information" hereinafter) is used to rewrite work keys and pieces of contract information in units of groups. The associated information includes group bits for grouping of the receiving stations, and station identification bits (group bits and station identification bits will be generically referred to hereinafter as "a group ID" or "group identification") for identifying a network to which each receiving station belongs.

A transmitting unit is adapted to convert at least one of the video and audio signals into digital data to form a transmission frame and includes an input unit for inputting data of conditions for scramble processing of the video and audio signals to be transmitted and data associated with contract information for determining right of each of receiving stations to receive a broadcasting service, an associated information generating section for generating information (scramble information) for performing descramble processing and charging in accordance with contract conditions, other than a program signal, on the basis of the data supplied from the input unit according to a scramble broadcasting/communication scheme, the scramble information including "program information" including information associated with a program and a key for descramble processing, "individual information" including contract information of each of the receiving stations and a work key for decrypting encrypted program information, "group information" including a group ID for designating a group to which each of the receiving stations belongs, contract information of each group, and a work key, and a synthesizing section for superposing the associated information generated by the associated information generating section on the transmission frame.

Each receiving unit is adapted to output images and sounds in accordance with received signals and includes an associated information extracting section for extracting associated information from received frame data, an group ID extracting section for extracting a group ID included in group information upon reception of the group information, and outputting data of the group ID, a work key extracting section for extracting a work key and outputting data of the work key, a contract information extracting section for extracting contract information and outputting data of the contract information, a memory for storing the group ID, the work key, and the contract information, a group ID comparator for receiving an output from the group ID extracting section, reading out the group ID written in the memory of each of the receiving stations in advance according to individual information, comparing the two group IDs to determine whether the group IDs coincide with each other, and performing control to rewrite contents of the memory only when the group IDs coincide with each other, and a memory control section for receiving an output from the group ID comparator to control the memory.

DETAILED DESCRIPTION OF THE PREFERRED EMBODIMENTS

The present invention will be described below with reference to the accompanying drawings.

Figure 1A:
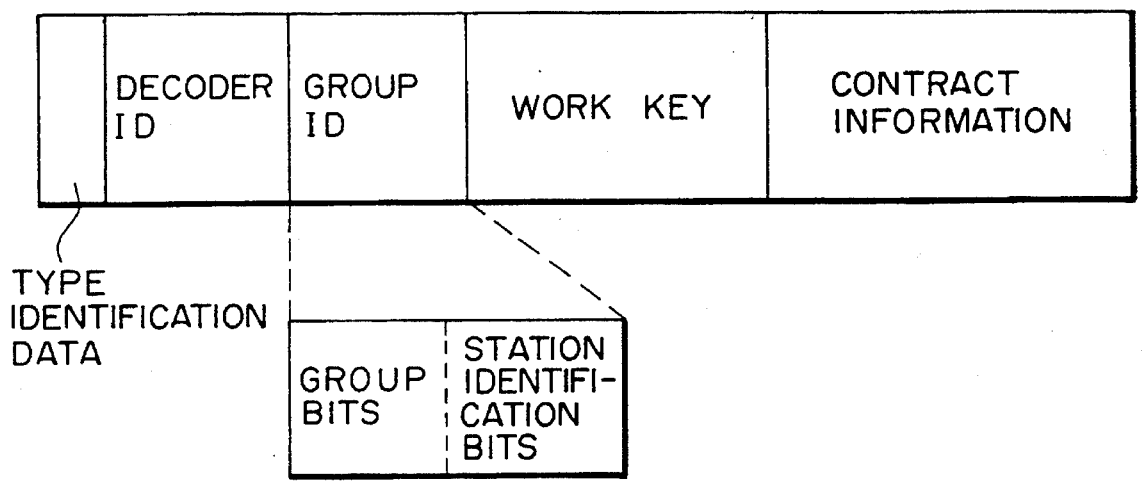
FIG. 1A is a block diagram showing the format of an individual information packet according to an embodiment of the present invention.
Figure 1B:
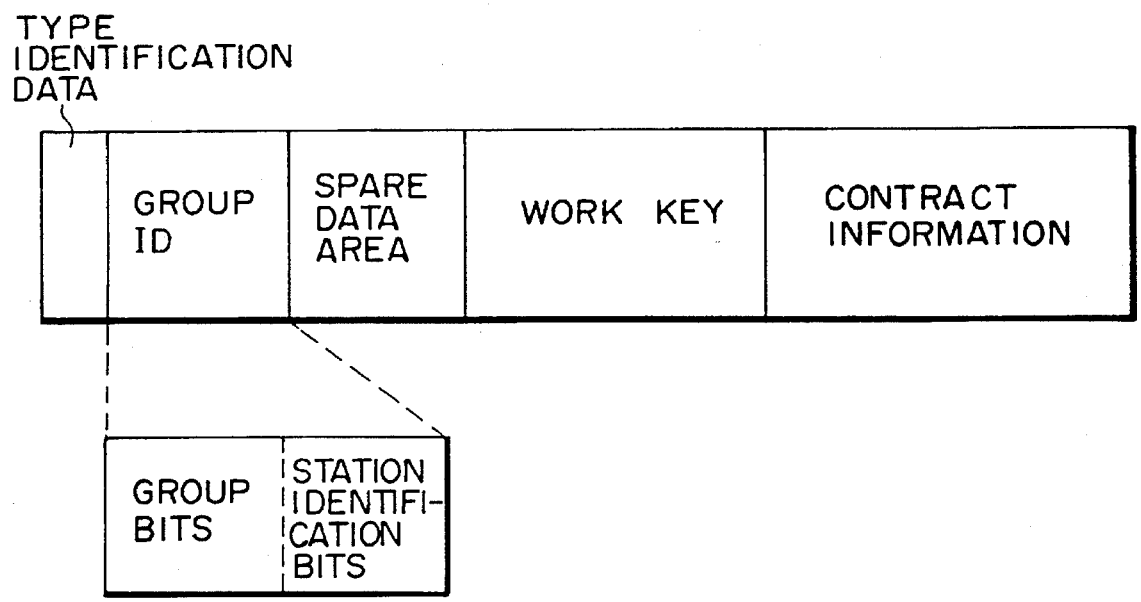
FIG. 1B is a block diagram showing the format of a group information packet according to the embodiment of the present invention.

FIG. 1A shows the format of an individual information packet used in a receiving station management apparatus according to an embodiment of the present invention. FIG. 1B shows the format of a group information packet.

Each individual information packet is constituted by type identification data for identifying the type of its own packet (e.g., program information and group information) from other types of packets, a decoder ID as the number of each receiving unit, group bits for designating a group to which each receiving station belongs, station identification bits for designating a network (broadcast station) to which each receiving station belongs, a work key for decrypting encrypted program information, and contract information which is information on the contract each receiving station has concerning its right to receive a broadcasting service.

Each group information packet is constituted by type identification data for identifying the type of its own packet (e.g., individual information and program information) from other types of packet, group bits for designating a group to which each receiving station belongs, station identification bits for designating a network to which each receiving station belongs, a work key for decrypting encrypted program information, and contract information which is information on a contract each receiving station has concerning its right to receive a broadcasting service.

In this embodiment, both video and audio signals are converted into digital signals to form one frame as a transmission signal to be transmitted.

Figure 2:
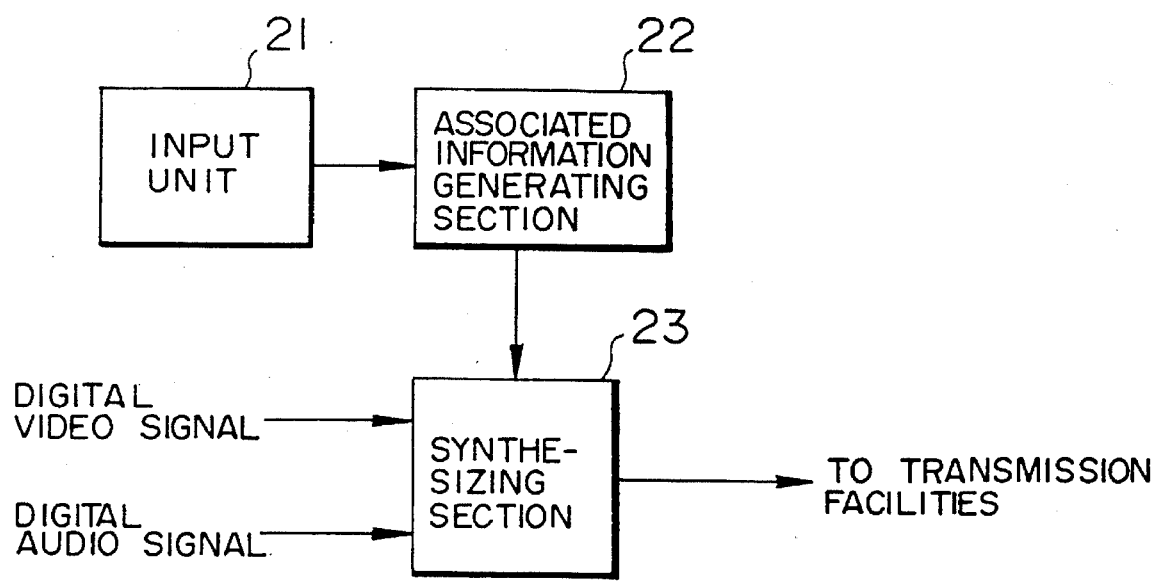
FIG. 2 is a block diagram showing a portion of a transmitting unit for multiplexing associated information with video and audio signals on the transmitting side according to the embodiment of the present invention.

FIG. 2 is a block diagram showing a portion of a transmitting unit in the embodiment of the present invention, which serves to multiplex associated information with video and audio signals.

Referring to FIG. 2, in the transmitting unit, at least a video signal or an audio signal is converted into digital data as a transmission frame. The transmitting unit includes an input unit 21, an associated information generating section 22, and a synthesizing section 23. The input unit 21 serves to input data associated with conditions of scramble processing of video and audio signals to be transmitted and data associated with contract information for determining whether to allow a receiving station to receive a broadcasting service. The associated information generating section 22 generates information (scrambled information) for performing descramble processing, charging and the like in accordance with contract conditions, other than a program signal, on the basis of the data supplied from the input unit 21 according to the scramble broadcasting/communication scheme. The scramble information includes "program information" including information associated with the program and a key for descramble processing, "individual information" including contract information of each receiving station and a work key for decrypting encrypted program information, "group information" including a group ID for designating a group to which each receiving station belongs, contract information of each group, and a work key, and the like. The synthesizing section 23 superposes the associated information generated by the associated information generating section 22 on the transmission frame.

The input unit 21 for inputting the contents of associated information is used to input data associated with conditions of scramble processing of video and audio signals to be transmitted and data associated with contract information for determining whether to allow the receiving station to receive a broadcasting service. For example, the input unit 21 sets data for a program to be broadcasted such that only a video signal is scrambled, but an audio signal is not scrambled, or sets contract information for determining whether to allow a receiving station to receive a broadcasting service for each program.

The associated information generating section 22 receives the data from the input unit 21 and converts the scrambled information into a packet. In addition, the synthesizing section 23 inserts the packet generated by the associated information generating section 22 in the digital video and audio signals to form a transmission frame, and outputs the frame to transmission facilities.

Figure 3:
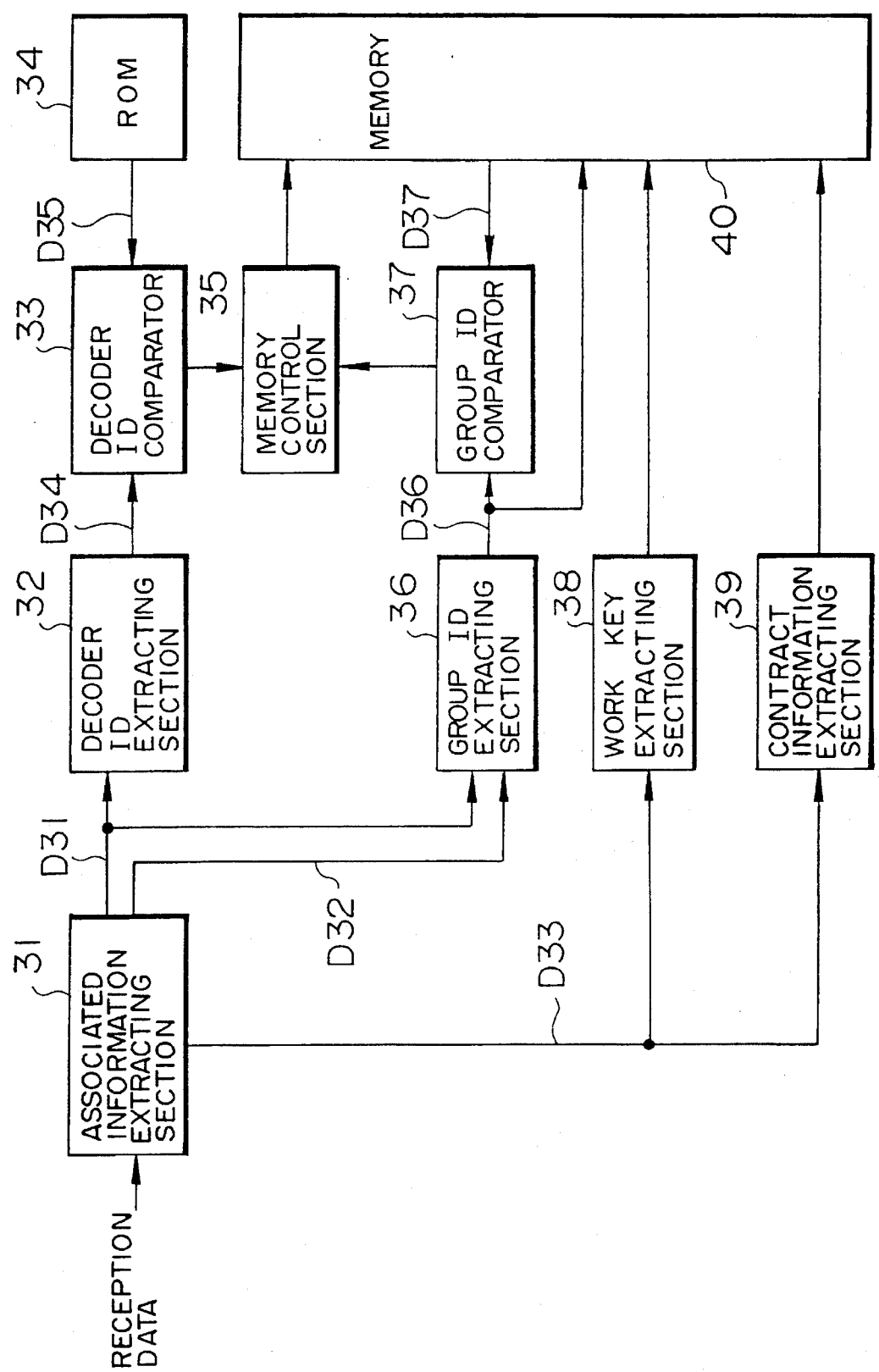
FIG. 3 is a block diagram showing a portion, of a receiving unit for outputting video and audio signals, which serves to process the data of the contents of a contract associated with scramble processing.

FIG. 3 is a block diagram showing a portion of a receiving unit for performing demodulation, descramble processing, and the like of a received signal and outputs the resultant video and audio signals to a monitor unit or the like, which portion serves to process data such as the contents of a contract associated with scramble processing.

An associated information extracting section 31 extracts associated information from reception data including received video and audio signals and the like.

Assume that individual information is received. In this case, a decoder ID number D35 written in a ROM 34 of the receiving unit is read out. In addition, a decoder ID included in received individual information data D31 is extracted by a decoder ID extracting section 32. A decoder ID comparator 33 then compares an output signal D34 from the decoder ID extracting section 32 with the decoder ID number D35 read out from the ROM 34 to determine whether they coincide with each other. Upon reception of an output signal from the decoder ID comparator 33, a memory control section 35 performs control to write (or rewrite) a group ID, a work key, and contract information in a memory 40 of the receiving unit only when the output signal indicates a coincidence.

The memory 40, in which the group ID, the work key, and the contract information are stored, receives an output from the memory control section 35, and output signals from a group ID extracting section 36, a work key extracting section 38, and a contract information extracting section 39, which respectively extract the group ID, the work key, and the contract information included in the individual information packet, are written in the memory 40. The individual information data D31 and group information data D32 output from the associated information extracting section 31 are received by the group ID extracting section 36.

Assume that group information is received. In this case, first of all, a group ID number D37 previously written in the memory 40 according to individual information is read out from the memory 40.

A group ID comparator 37 then compares this group ID number D37 with a group ID number D36 included in the received group information to determine whether they coincide with each other. Upon reception of an output signal from the decoder ID comparator 33, the memory control section 35 performs control to rewrite the work key and the contract information in the memory 40 of the receiving unit only when the output signal indicates a coincidence.

The work key extracting section 38 and the contract information extracting section 39 receive group information data D33 from the associated information extracting section 31. Output signals from the work key extracting section 38 and the contract information extracting section 39 are written in the memory 40 under the control of an output signal from the memory control section 35.

The above operation will be described in more detail below. If, for example, four bits ("0000" to "1111") are assigned as group bits, receiving stations can be formed into 16 groups.

First of all, individual information is transmitted to a receiving unit managed by the home station, and a group to which the receiving unit belongs, a work key A, and contract information A are written in the memory of the receiving unit.

Assume that the work keys and the pieces of contract information written in the memories of decoders belonging to a group designated by the group bits "0000" are to be rewritten altogether. In this case, the group bits of group information are designed as "0000" on the transmitting side, and group information including a new work key B and new contract information B is transmitted.

On the receiving side, when the group information is received, the group ID extracting section 36 extracts a group ID (having the group bits "0000") from the received group information. In addition, the group ID number D37 previously written according to the individual information is read out from the memory 40. In each receiving unit whose group bits written according to the individual information are "0000", the group ID comparator 37 compares the received group ID number D36 with the group ID number D37 read out from the memory 40. Since they coincide with each other, the work key B and the contract information B are written in the memory 40. In each of receiving units other than those whose group bits previously written according to the individual information are "0000", since the group IDs compared with each other by the group ID comparator 37 do not coincide with each other, the contents of the memory are not rewritten.

In this manner, in each receiving unit, encrypted associated information (program information) including information indicating the range in which the subscriber can watch and listen to a received program and a scramble key for allowing a legitimate subscriber to descramble a scrambled program is decrypted by using the work key and the contract information associated with the right to receive a broadcasting service, which are written in the memory 40, and the scrambled video and audio signals and the like are descrambled by using the program information.

The second embodiment of the present invention will be described next. The following two functions are added to each receiving unit:

(1) a function of causing a memory control section 35 to perform control so as to rewrite the contents of a memory, regardless of determination of coincidence/ noncoincidence by a group ID comparator 37, only when a predetermined set of bits, as group bits, included in a group ID in received group information is received.

(2) a function of designating a rewrite range of the contents of the memory in the receiving unit by using rewrite identification bits set in a group information packet. The rewritten identification bits are bits for performing control to select whether to rewrite only a work key, only contract information, or both of them.

If, for example, four bits ("0000" to "1111") are assigned as group bits, the number of groups into which receiving units can be formed is set to be 15 ("0000" to "1100"), and the remaining one set of bits ("1111") is determined as bits effective for all the groups. Assume that a given receiving unit receives group information including the group bits "1111". In this case, the group ID comparator 37 determines a noncoincidence. However, since the received group bits are "1111", writing process with respect to a memory 40 is enabled by the memory control section 35 regardless of the determination result obtained by the group ID comparator 37.

Assume that only the work keys in all the groups (all the receiving stations) are to be rewritten. In this case, if rewriting process is performed in all the groups altogether, even the contents of the pieces of contract information of the respective groups, which are different from each other, become the same.

For this reason, only the work key of the data stored in each memory 40 is rewritten by using the rewrite identification bits. A rewrite identification extracting section is arranged in each receiving unit to extract the rewrite identification bits from received group information. Upon reception of an output signal from this section, the memory control section 35 controls address data for write access to the memory 40, thereby rewriting only the work key. With this operation, the work keys can be transmitted to all the receiving units without rewriting the contract information.

In addition, as indicated by the Telecommunication Technology Council Inquiry Report No. 17 as well, a predetermined portion of the data contents of individual information as scramble information is generally encrypted. In the present invention as well, the data contents of individual information and group information are encrypted on the transmitting side, and the encrypted data are decrypted on the receiving side. With such additional processing, greater security of scramble processing can be ensured.

As has been described above, in the receiving station management apparatus of the present invention, receiving stations are formed into a plurality of groups. When work keys and pieces of contract information are to be rewritten in units of groups, since associated information (group information) including group bits for grouping of the receiving stations is arranged, the above contents can be rewritten in units of groups. Therefore, rewriting process can be performed much more quickly than conventional rewriting process using individual information.

What is claimed is:

1. A receiving station management apparatus including a transmitting unit for outputting video and audio signals, said transmitting unit for converting at least one of the video and audio signals into digital data to form a transmission frame, said transmitting unit comprising:

an input unit for inputting data for scramble processing of the video and audio signals, and data for determining which receiving stations receive a broadcasting service;

an information generating section for generating scrambled information for performing descramble processing and for charging on the basis of the data supplied from said input unit, the scrambled information including program information including information associated with a program and a key for descramble processing, individual information including contract information for each of said receiving stations and a work key for decrypting encrypted program information, group information including a group identification for designating a group to which each of said receiving stations belongs, contract information of each group, and a work key; and a synthesizing section for inserting the information generated by said information generating section on the transmission frame.

2. A receiving station management apparatus including receiving stations for outputting images and sounds in accordance with received signals, each of said receiving units comprising:

an information extracting section for extracting information from received frame data;

a group identification extracting section for extracting a group identification included in group information received upon reception of the group information, and outputting data of the group identification;

a work key extracting section for extracting a work key and outputting data of the work key;

a contract information extracting section for extracting contract information and outputting data of the contract information;

a memory for storing the group identification, the work key, and the contract information;

a group identification comparator for receiving an output from said group identification extracting section, reading out the group identification written in said memory of each of said receiving stations, comparing the two groups identification to determine whether the group identifications coincide with each other; and a memory control section for receiving an output from said group identification comparator and controlling said memory, and for rewriting contents of said memory only when the group identification comparator indicates that the group identifications coincide with each other.

* * * * *